(12) United States Patent
Yang (10) Patent No.: US 11,176,648 B2
(45) Date of Patent: Nov. 16, 2021

(54) IMAGE CAPTURING METHOD AND DEVICE, COMPUTER READABLE STORAGE MEDIUM

(71) Applicant: BEIJING XIAOMI MOBILE SOFTWARE CO., LTD., Beijing (CN)

(72) Inventor: Song Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 76 days.

(21) Appl. No.: 16/699,619

(22) Filed: Nov. 30, 2019

(65) Prior Publication Data

US 2021/0027438 A1    Jan. 28, 2021

(30) Foreign Application Priority Data

Jul. 23, 2019    (CN) .......................... 201910668088.7

(51) Int. Cl.
*G06T 5/40*    (2006.01)
*G06T 5/00*    (2006.01)

(52) U.S. Cl.
CPC ............... *G06T 5/40* (2013.01); *G06T 5/001* (2013.01); *G06T 2207/10016* (2013.01)

(58) Field of Classification Search
CPC . G06T 5/40; G06T 5/001; G06T 2207/10016; G06T 2207/30168; G06T 7/0002; H04N 5/2171; H04N 5/2628
See application file for complete search history.

(56) References Cited

U.S. PATENT DOCUMENTS

| 8,199,215 B2 * | 6/2012 | Phelippeau ............... G06T 5/20 |
| | | 348/222.1 |
| 10,185,892 B1 * | 1/2019 | Mishra ................. H04N 17/002 |
| 2012/0114240 A1 * | 5/2012 | Yamada ..................... G06T 7/11 |
| | | 382/173 |
| 2013/0343567 A1 | 12/2013 | Triplett |
| 2014/0293079 A1 * | 10/2014 | Milanfar ............... H04N 5/2171 |
| | | 348/222.1 |
| 2015/0163400 A1 * | 6/2015 | Geiss .................. H04N 5/23229 |
| | | 348/231.99 |
| 2016/0301857 A1 * | 10/2016 | Vranceanu ............. G06K 9/036 |

(Continued)

FOREIGN PATENT DOCUMENTS

| CN | 105160667 A | 12/2015 |
| CN | 107146216 A | 9/2017 |

(Continued)

OTHER PUBLICATIONS

First OA for CN application 201910668088.7, dated Jan. 5, 2021.
Search Report for EP application 19219474.4 dated Mar. 19, 2020.

*Primary Examiner* — Kim Y Vu
*Assistant Examiner* — Francisco A Agra
(74) *Attorney, Agent, or Firm* — Syncoda LLC; Feng Ma (57) ABSTRACT

An image capturing method includes: obtaining a video frame during capturing images through a camera; extracting a target histogram feature based on the video frame; inputting the target histogram feature into an image quality recognition model which is used to determine whether an image is fuzzy based on a histogram feature, and outputting an image quality recognition result of the video frame; and in response to the image quality recognition result indicating that the video frame is fuzzy, prompting the user to clean the camera.

14 Claims, 5 Drawing Sheets

(56) References Cited

U.S. PATENT DOCUMENTS

2018/0005023 A1\* 1/2018 Kounavis ................ G06T 7/246
2018/0114068 A1\* 4/2018 Balasundaram ........ G06T 7/143

FOREIGN PATENT DOCUMENTS

| CN | 108121942 A | 6/2018 |
| CN | 108898592 A | 11/2018 |
| CN | 109104568 A | 12/2018 |
| CN | 106683079 B | 5/2019 |

\* cited by examiner

IMAGE CAPTURING METHOD AND DEVICE, COMPUTER READABLE STORAGE MEDIUM

CROSS-REFERENCE TO RELATED APPLICATION

This application claims priority of Chinese Patent Application 201910668088.7, filed on Jul. 23, 2019, the disclosure of which is hereby incorporated by reference in its entirety.

BACKGROUND

With the development of image processing technologies, it has become more popular for terminals to be implemented with image capturing functions. Such terminals may include, for example, smart phones, tablet computers and cameras. When capturing images based on these terminals, a requirement for the cleanliness of camera surface is relatively high. If the camera surface is clean, the captured image is clearer with a better quality; whereas if the camera surface is contaminated by dust, grease or other pollutants, the captured image can be fuzzy with a poor quality.

SUMMARY

The present disclosure relates generally to the fields of image processing technologies, and more specifically to an image capturing method, an image capturing device and a computer readable storage medium.

According to a first aspect of embodiments of the present disclosure, an image capturing method is provided, including: acquiring a video frame in a process of capturing an image through a camera; extracting a target histogram feature based on the video frame; extracting a target histogram feature based on the video frame; in response to the image quality recognition result indicating a fuzzy image quality, prompting a user to clean the camera.

In some embodiments of the present disclosure, extracting the target histogram feature based on the video frame, including: zooming the video frame to obtain a zoomed image; obtaining a filtered image based on pixel values of each pixel point on three color channels in the zoomed image; and extracting the target histogram feature from the filtered image.

In some other embodiments of the present disclosure, obtaining the filtered image based on the pixel values of each pixel point on three color channels in the zoomed image including: obtaining a minimum pixel value from the pixel values of each pixel point on the three color channels; generating a minimum-pixel-value image composed of the minimum pixel values of all the pixel points; using a preset window to slide on the minimum-pixel-value image and obtaining the minimum pixel value within the preset window for each sliding; and generating the filtered image composed of the minimum pixel values within the preset window for all the slidings.

In some other embodiments of the present disclosure, extracting the target histogram feature from the filtered image including: summing up a number of pixel points for each pixel value contained in the filtered image; drawing a target histogram corresponding to the filtered image based on each pixel value and the number of pixel points corresponding to the pixel value; and extracting the target histogram feature from the target histogram.

In some other embodiments of the present disclosure, the method further includes training the image quality recognition model including: obtaining a plurality of training sample images, each training sample image being labeled with an image quality label; extracting a histogram feature of each training sample image; determining an initial image quality recognition model; inputting the histogram feature of each training sample image into the initial image quality recognition model and outputting a predicted value of each training sample image; inputting the predicted value of each training sample image and a value of the image quality label for each training sample image into a pre-constructed target loss function; and adjusting parameters of the initial image quality recognition model based on a function value of the pre-constructed target loss function to obtain the image quality recognition model.

According to a second aspect of embodiments of the present disclosure, an image capturing device is provided, including: an acquisition module, configured to acquire a video frame in a process of capturing an image through a camera; an extraction module, configured to extract a target histogram feature based on the video frame; a processing module, configured to input the target histogram feature into an image quality recognition model and output an image quality recognition result of the video frame, the image quality recognition model being configured to determine whether an image quality is fuzzy based on a histogram feature; and a prompting module, configured to prompt a user to clean the camera in response to the image quality recognition result indicating a fuzzy image quality.

In some embodiments of the present disclosure, the extraction module is configured to zoom the video frame to obtain a zoomed image; obtain a filtered image based on pixel values of each pixel point on three color channels in the zoomed image; and extract the target histogram feature from the filtered image.

In some other embodiments of the present disclosure, the extraction module is configured to obtain a minimum pixel value from the pixel values of each pixel point on the three color channels; generate a minimum-pixel-value image composed of the minimum pixel values of all the pixel points; use a preset window to slide on the minimum-pixel-value image and obtain the minimum pixel value within the preset window for each sliding; and generate the filtered image composed of the minimum pixel values within the preset window for all the slidings.

In some other embodiments of the present disclosure, the extraction module is configured to sum up a number of pixel points for each pixel value contained in the filtered image; draw a target histogram corresponding to the filtered image based on each pixel value and the number of pixel points corresponding to the pixel value; and extract the target histogram feature from the target histogram.

In some other embodiments of the present disclosure, the device further includes: a determination module and a determination module. The acquisition module is configured to obtain a plurality of training sample images, each training sample image being labeled with an image quality tag. The extraction module is configured to extract a histogram feature of each training sample image. The determination module is configured to determine an initial image quality recognition model. The training module is configured to input the histogram feature of each training sample image into the initial image quality recognition model, output a predicted value of each training sample image, input the predicted value of each training sample image and a value of the image quality label for each training sample image into a pre-constructed target loss function, and adjust parameters of the initial image quality recognition model based on a function value of the pre-constructed target loss function to obtain the image quality recognition model.

According to a third aspect of embodiments of the present disclosure, an image capturing device is provided, including: a processor; a memory configured to store instructions executable by the processor. The processor is configured to: acquire a video frame in a process of capturing an image through a camera; extract a target histogram feature based on the video frame; input the target histogram feature into an image quality recognition model and output an image quality recognition result of the video frame, the image quality recognition model being configured to determine whether an image quality is fuzzy based on a histogram feature; and in response to the image quality recognition result indicating a fuzzy image quality, prompt a user to clean the camera.

According to a fourth aspect of embodiments of the present disclosure, a computer readable storage medium is provided, having at least one instruction stored therein. The at least one instruction is loaded and executed by a processor to realize the image capturing method.

It should be understood that the above general description and the subsequent detailed description are only exemplary and explanatory and shall not be used as the limitation of this disclosure.

BRIEF DESCRIPTION OF THE DRAWINGS

The accompanying drawings herein are incorporated into the specification and constitute a part of the disclosure, showing the embodiments according to the present disclosure, and used to explain the principle of the present disclosure together with the specification.

DETAILED DESCRIPTION

The example embodiments will be described in detail here. The examples are given in the accompanying drawings. When the following description relates to the drawings, unless specified or limited otherwise, the same or similar elements and the elements having same or similar functions are denoted by like reference numerals throughout the descriptions. The implementations described in the following example embodiments do not represent all implementations consistent with the present disclosure. Instead, they are only examples of device and method consistent with some aspects of the present disclosure described in detail in the accompanying claims.

Due to a small size of the terminal, when a user uses the terminal, the user's fingers may touch the camera unintentionally, causing the camera surface contaminated, especially when the user's fingers are stained, the camera surface will be contaminated more seriously. In this case, the user may continue to use the camera for capturing without knowing that the camera surface has been contaminated, thus leading to the captured image very fuzzy.

Figure 1:
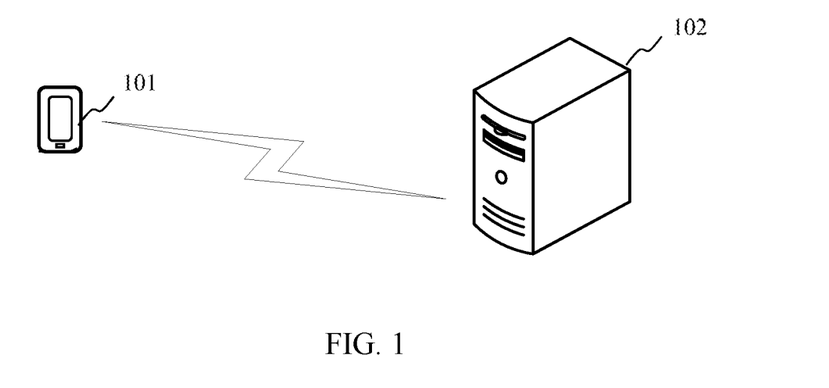
FIG. 1 is an implementation environment involved in an image capturing method according to an example embodiment.

FIG. 1 shows an implementation environment involved in an image capturing method provided by some embodiments of the present disclosure. As illustrated in FIG. 1, the implementation environment includes a terminal 101 and a server 102.

The terminal 101 is equipped with a camera, which includes at least one of a front camera or a rear camera. The terminal 101 is installed with a camera application, which can call the camera to take photos. The terminal 101 can be a smart phone, a tablet computer, a digital camera and other devices. The present disclosure does not specify the product type of the terminal 101.

The terminal 101 with a powerful computing function can train the image quality recognition model and determine an image quality recognition result of a video frame based on the trained image quality recognition model, and then prompt a user to clean the camera when the image quality recognition result indicates a fuzzy image quality, so as to capture images based on the cleaned camera.

As a background server of the camera application, the server 102 can provide image capturing service based on the camera application.

For the terminal 101 with a poor computing function, the server can train the image quality recognition model, receive the video frame transmitted by the terminal 101, determine the image quality recognition result of the received video frame based on the trained image quality recognition model and transmit the image quality recognition result to the terminal 101, such that the terminal may prompt the user to clean the camera when the image quality recognition result indicates a fuzzy image quality, such that images can be captured based on the cleaned camera.

Figure 2:
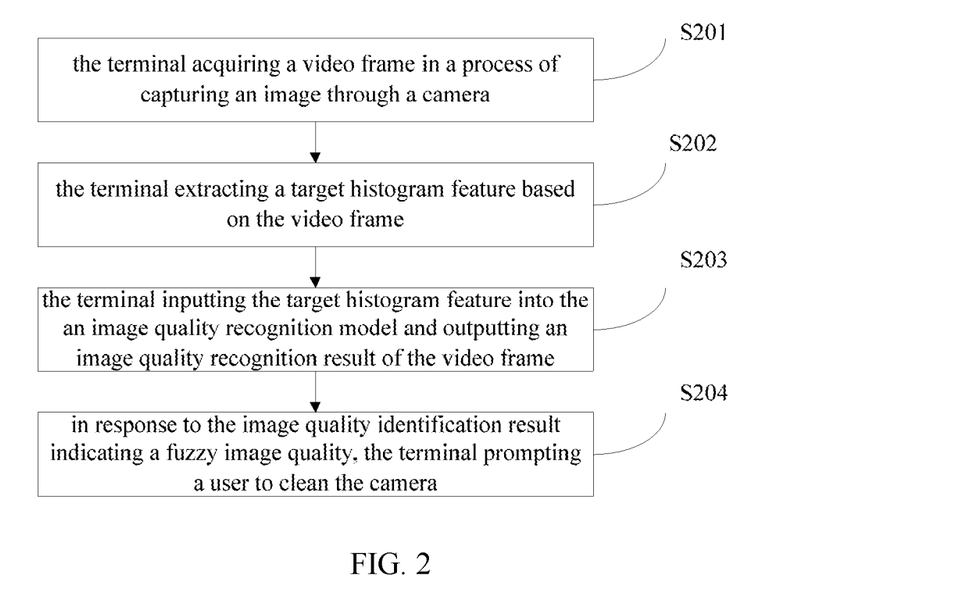
FIG. 2 is a flowchart of an image capturing method according to an example embodiment.

Based on the implementation environment shown in FIG. 1, FIG. 2 is a flowchart of an image capturing method according to an example embodiment. As shown in FIG. 2, the image capturing method can be applied to the terminal, and some of the steps can also be applied to the server, including the following steps.

In step S201, the terminal acquires a video frame in a process of capturing an image through a camera.

The video frame can be either an image formally taken by the camera or an image presented in a preview interface before the image is taken by the camera. When it is detected that the camera application is started, the terminal captures an image through the camera, during the process of capturing the image through the camera, the terminal can display the video frame on the preview interface of camera application. To ensure that the taken image has a clear image quality, the terminal can obtain at least one video frame from the preview interface. By identifying the image quality of the at least one video frame, it can determine whether the camera is contaminated, such that the image quality of the taken image can be improved by cleaning the camera.

In step S202, a target histogram feature is extracted based on the video frame.

In this step, the target histogram feature of the video frame can be extracted.

In step S203, the target histogram feature is input into an image quality recognition model and an image quality recognition result of the video frame is output.

The image quality recognition model is used to determine whether the image quality an image is fuzzy based on the histogram feature. After obtaining the target histogram feature of the video frame, the terminal inputs the target histogram feature into the image quality recognition model to output the image quality recognition result of the video frame. If the image quality recognition result indicates a fuzzy image quality, the terminal can execute step S204, in which the user is prompted to clean the camera, so as to obtain the image with a good image quality. If the image quality recognition result indicates a clear image quality, the terminal can capture the image directly.

Furthermore, steps S202-S203 can also be executed by the server. That is, the server receives the video frame obtained by the terminal to extract the target histogram feature, obtains the image quality identification result of the video frame, and then sends the image quality identification result to the terminal.

In step S204, in response to the image quality identification result indicating a fuzzy image quality, the terminal prompts a user to clean the camera.

When it is identified that the image quality of the video frame is fuzzy, the terminal prompts the user to clean camera in following ways, including but not limited to: first way, the terminal can prompt the user to clean the camera by playing a specified audio file; second way, the terminal can control a flashlight to flicker at a first preset frequency so as to prompt the user to clean the camera, the first preset frequency can be 20 times/minute or 30 times/minute, etc.; third way, the terminal can control a vibrating motor to vibrate at a second preset frequency so as to prompt the user to clean the camera, the second preset frequency can be 10 times/minute or 20 times/minute, etc.

After the camera is cleaned, the terminal can capture an image based on the cleaned camera. Since the surface of the camera for image capturing is clean, the obtained image is clear with a good quality.

With the method provided by this embodiment, every time an image is captured, firstly the image quality of the video frame is identified based on the image quality recognition model and then the user is prompted to clean the camera in response to the result that the identified image quality of the video frame is fuzzy, such that the image can be captured based on the cleaned camera. With this method, the quality of captured image is improved.

Figure 3:
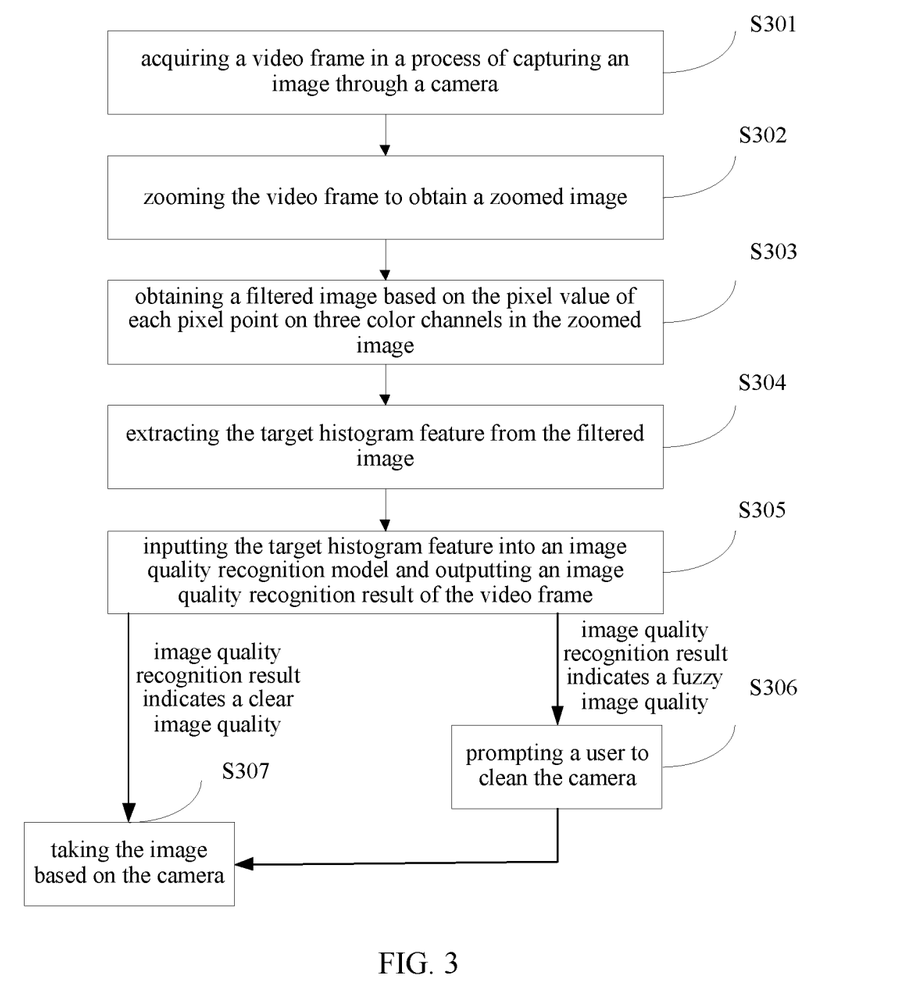
FIG. 3 is a flowchart of an image capturing method according to another example embodiment.

Based on the implementation environment shown in FIG. 1, FIG. 3 is a flowchart of an image capturing method according to an example embodiment. As shown in FIG. 3, the image capturing method is applied to the terminal, including following steps.

In step S301, a video frame is acquired in a process of capturing an image through a camera.

In step S302, the video frame is zoomed to obtain a zoomed image.

The terminal zooms the video frame according to a predefined size to obtain the zoomed image with the same size as the predefined size. The predefined size can be determined according to a precision of the image quality recognition, which can be 256*256 or 128*128, etc.

In step S303, a filtered image is obtained based on pixel values of each pixel point on three color channels in the zoomed image.

The three color channels include red, green and blue channels. When obtaining the filtered image according to the pixel values of each pixel point on three color channels in the zoomed image, the corresponding steps are as follows.

Step one: a minimum pixel value is obtained from the pixel values of each pixel point on the three color channels.

For each pixel point in the zoomed image, the pixel values on the three color channels are obtained and the minimum pixel value is obtained from the pixel values on the red, green and blue channels.

Step two: a minimum-pixel-value image composed of the minimum pixel values of all the pixel points is generated;

Step three: a preset window is used to slide on the minimum-pixel-value image and the minimum pixel value within the preset window is obtained for each sliding.

The preset window is used to slide on the minimum-pixel-value image, with a sliding length equal to a preset step size. Then, the pixel value of each pixel point in the minimum-pixel-value image within the preset window is traversed. By traversing the minimum-pixel-value image, the minimum pixel value within the preset window for each sliding can be obtained. The size of the preset window can be defined according to a processing precision of the terminal, which can be 15*15 or 20*20, etc. To ensure that every pixel point in the minimum-pixel-value image can be traversed, the preset step size should be less than or equal to a length of the preset window. In this way, the same pixel point may appear in the preset window for different slidings, which does not affect the terminal to obtain the minimum pixel value within the preset window.

Step four: the filtered image composed of the minimum pixel values within the preset window for all the slidings is generated.

In step S304, the target histogram feature is extracted from the filtered image.

When extracting the target histogram feature from the filtered image, the corresponding steps are as follows.

Step one: for each pixel value included in the filtered image, the number of corresponding pixel points is summed up.

For any pixel point, the corresponding pixel value is within the range of 0~255. According to the pixel value, there are 256 kinds of pixel values, which are respectively the pixel value with value=0, the pixel value with value=1 . . . and the pixel value with value=255.

Step two: the target histogram corresponding to the filtered image is drawn according to each pixel value and the number of pixel points corresponding to the pixel value.

The histogram is a statistical report graph. It is composed of a series of vertical stripes or line segments of different heights which represent a distribution of data. Generally, the horizontal axis can be used to represent a data type and the vertical axis can be used to represent a distribution state. The number of pixel points for each pixel value included in the filtered image is summed up and the target histogram corresponding to the filtered image is drawn according to each pixel value and the number of pixel points corresponding to the pixel value. The horizontal axis of the histogram represents the pixel value, while the vertical axis represents the number of pixel points for the pixel value. Since the number of possible pixel values of a pixel point is 256, in order to facilitate drawing of the histogram corresponding to the filtered image, the 256 pixel values can be divided into 16 pixel intervals, then the histogram can be drawn based on the pixel intervals and the number of pixel values. When dividing the 256 pixel values into 16 pixel intervals, the terminal can orderly divide the 256 pixel values into 16 pixel intervals according to the pixel values. For example, the pixel values with value in a range of 0~15 are divided into an interval, the pixel values with value in a range of 16~31 are divided into an interval . . . and the pixel values with value in a range of 240~255 are divided into an interval.

Step three: the target histogram feature is extracted from the target histogram.

A feature vector is constructed according to the drawn target histogram where the divided pixel interval is taken as a vector element and the number of pixel points corresponding to the pixel interval is taken as a coefficient for the vector element. Then, the feature vector is the target histogram feature.

For example, the divided pixel intervals in the target histogram include the pixel interval with pixel values having value in a range of 0~15, the pixel interval with pixels values having value in a range of 16~31, . . . , and the pixel interval with pixel values having value in a range of 240~255. The number of pixel points corresponding to the pixel interval with pixel values having value in a range of 0~15 is 20, the number of pixel points corresponding to the pixel interval with pixel values having value in a range of 16~31 is 100 . . . , and the number of pixel points corresponding to the pixel interval with pixel values having value in a range of 240~255 is 50. Then, the feature vector constructed with the divided pixel interval as the vector element and the number of pixel points corresponding to the pixel interval as the coefficient of the vector element is 20 (0, 15)+100 (16, 31)+ . . . +50 (240, 255). This feature vector is configured as the target histogram feature.

In step S305, the target histogram feature is input into an image quality recognition model and an image quality recognition result of the video frame is output. If the image quality recognition result indicates a fuzzy image quality, the step S306 is executed; while if the image quality recognition result indicates a clear image quality, the step S307 is executed.

In step S306, a user is prompted to clean the camera, thus the process ends.

In step S307, the image is taken based on the camera, thus the process ends.

With the method provided by this embodiment, every time an image is captured, firstly the image quality of the video frame is identified based on the image quality recognition model and then the user is prompted to clean the camera in response to the result that the identified image quality of the video frame is fuzzy, such that the image can be captured based on the cleaned camera. With this method, the quality of captured image is improved.

Furthermore, any of steps S302~305 can be executed by the terminal or the server. For example, steps S302~S304 can be executed by the terminal; step S305 can be executed by the server; or steps S302~S305 can be executed all by the server; or, other allocation of steps can be used, which are not repeated here.

Figure 4:
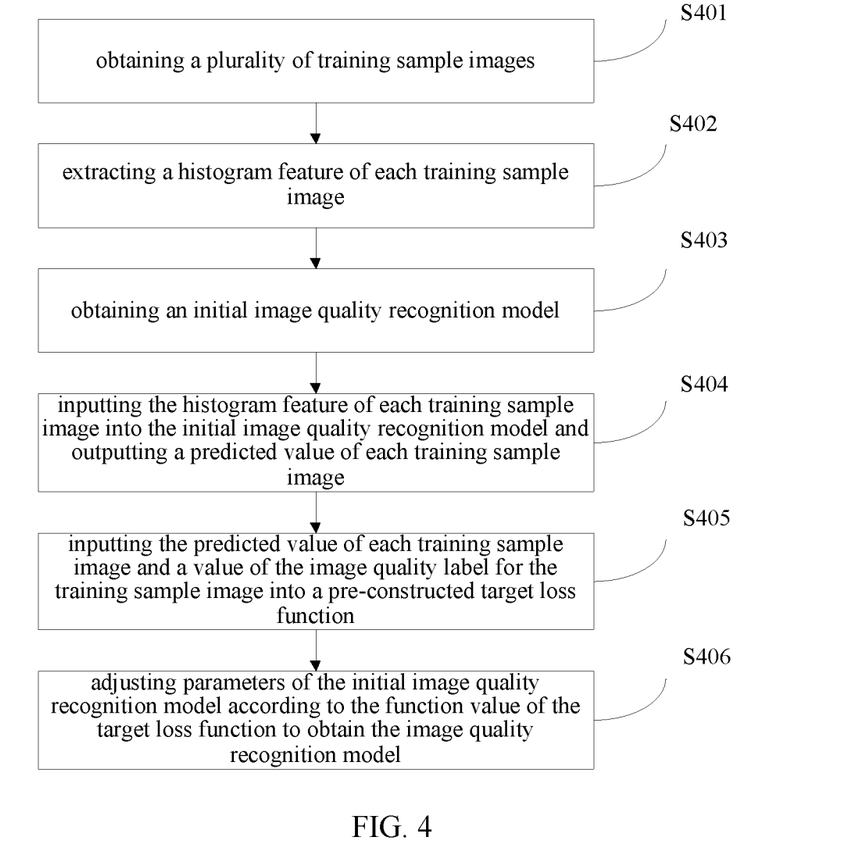
FIG. 4 is a flowchart of a method for training an image quality recognition model according to an example embodiment.

Based on the implementation environment shown in FIG. 1, FIG. 4 is a flowchart of a method for training an image quality recognition model according to an example embodiment. As shown in FIG. 4, the method for training the image quality recognition model is used in the terminal or the server. For the terminal with a powerful computing function, the trained image quality recognition model can be operated in the terminal to determine the image quality recognition result of the image taken by the terminal. The embodiment shown in FIG. 4 includes following steps.

In step S401, a plurality of training sample images are obtained.

Each training sample image is labeled with an image quality label which may be "Clear" or "Fuzzy". When acquiring the plurality of training sample images, a plurality of images each with the image quality label can be obtained from the Internet, and the acquired images can be taken as the training sample images.

In step S402, a histogram feature of each training sample image is extracted.

When extracting the histogram feature of any training sample image, the corresponding steps are as follows.

4021: the training sample image is zoomed to obtain a zoomed training sample image.

The training sample image is zoomed according to a predefined size to obtain the zoomed training sample image with the same size as the predefined size.

4022: a filtered training sample image is obtained according to pixel values of each pixel point on three color channels in the zoomed training sample image.

When obtaining the filtered training sample image according to the pixel values of each pixel point on three color channels in the zoomed training sample image, the corresponding steps are as follows.

Step One: a minimum pixel value is obtained from the pixel values of each pixel point on three color channels.

For each pixel point in the zoomed training sample image, the pixel values on the three color channels are obtained and the minimum pixel value is obtained from the pixel values on the red, green and blue channels. For example, for any pixel point on the zoomed training sample image, the pixel values of the pixel point on the red, green and blue channels are 250, 170 and 85 respectively; then, the minimum pixel value obtained by the terminal from the pixel values of the pixel point on the red, green and blue channels is 85.

Step two: a minimum-pixel-value training sample image composed of the minimum pixel values of all the pixel points is generated.

The minimum pixel value of each pixel point is obtained from the pixel values of the pixel point on three color channels in the zoomed training sample image, then the minimum-pixel-value training sample image composed of the minimum pixel values of all the pixel points is generated. For example, the zoomed training sample image includes 10,000 pixel points and the minimum pixel values obtained from the 10,000 pixel points are 20, 16, 43 . . . 8 respectively. Then, the terminal forms the minimum pixel values 20, 16, 43 . . . 8 of these 10,000 pixel points into the minimum-pixel-value training sample image.

Step three: a preset window is used to slide on the minimum-pixel-value training sample image and the minimum pixel values within each preset window is obtained for each sliding.

For the detailed sliding mode, please refer to the above embodiment.

Step four: a filtered training sample image composed of the minimum pixel values within the preset window for all the slidings is generated.

The terminal obtains the minimum pixel value within the preset window for each sliding and forms the minimum pixel values within the preset window for all the slidings into the filtered training sample image.

4023: the histogram feature is extracted from the filtered training sample image.

Furthermore, when extracting the histogram feature from the filtered training sample image, the corresponding steps are as follows.

Step one: for each pixel value included in the filtered training sample image, the number of pixel points is summed up.

Step two: a histogram corresponding to the filtered training sample image is drawn according to each pixel value and the number of pixel points corresponding to the pixel value.

Step three: the histogram feature is extracted from the histogram.

For the detailed extraction mode, please refer to the above embodiment.

In step S403, an initial image quality recognition model is determined.

The initial image quality recognition model can be an SVM (Support Vector Machine) model, etc.

In step S404, the histogram feature of each training sample image is input into the initial image quality recognition model and a predicted value of each training sample image is output.

In step S405, the predicted value of each training sample image and a value of the image quality label for the training sample image are input into a pre-constructed target loss function.

In this step, the target loss function can be constructed for the initial image quality identification model in advance and initial values can be set for parameters of the initial image quality recognition model. Based on the initial values, the predicted value of each training sample image can be determined. Then, the predicted value of each training sample image and the value of the image quality label for the training sample image are input into the pre-constructed target loss function to calculate the function value of the target loss function.

In step S406, the parameters of the initial image quality recognition model are adjusted according to the function value of the target loss function to obtain the image quality recognition model.

If the function value of the target loss function does not meet a threshold condition, the parameters of initial image quality recognition model are adjusted and the function value of the target loss function is calculated again, until the obtained function value meets the threshold condition. The threshold condition can be set according to the processing precision.

When the threshold condition is met, the value of each parameter is obtained and the initial image quality recognition model corresponding to the value is taken as the image quality recognition model. The image quality recognition model is used to determine whether the image quality of an image is fuzzy based on the histogram feature.

Figure 5:
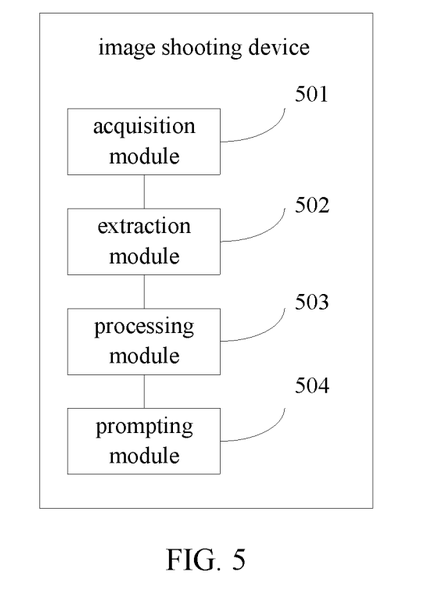
FIG. 5 is a block diagram of an image capturing device according to an example embodiment.

FIG. 5 is a block diagram of an image capturing device according to an example embodiment. According to FIG. 5, the device includes an acquisition module 501, an extraction module 502, a processing module 503, a prompting module 504 and a image capturing module 505.

The acquisition module 501 is configured to acquire a video frame in a process of capturing an image through a camera.

The extraction module 502 is configured to extract a target histogram feature according to the video frame.

The processing module 503 is configured to input the target histogram feature into an image quality recognition model, and output an image quality recognition result of the video frame; the image quality recognition model being configured to determine whether an image quality is fuzzy based on a histogram feature.

The prompting module 504 is configured to prompt a user to clean the camera in response to the image quality recognition result indicating a fuzzy image quality.

In some other embodiments of the present disclosure, the extraction module 502 is configured to zoom the video frame to obtain a zoomed image; obtain a filtered image based on pixel values of each pixel point on three color channels in the zoomed image; and extract the target histogram feature from the filtered image.

In some other embodiments of the present disclosure, the extraction module 502 is configured to obtain a minimum pixel value from the pixel values of configured three color channels; generate a minimum-pixel-value image composed of the minimum pixel values of all the pixel points; use a preset window to slide on the minimum-pixel-value image and obtain the minimum pixel value within the preset window for each sliding; and generate the filtered image composed of the minimum pixel values within the preset window for all the slidings.

In some other embodiments of the present disclosure, the extraction module 502 is configured to sum up a number of pixel points for each pixel value included in the filtered image; draw a target histogram corresponding to the filtered image based on each pixel value and the number of pixel points corresponding to the pixel value; and extract the target histogram feature from the target histogram.

In some other embodiments of this disclosure, the device further includes a training module.

The acquisition module 501 is configured to obtain a plurality of training sample images, each training sample image is labeled with an image quality tag.

The extraction module 502 is configured to extract a histogram feature of each training sample image.

The acquisition module 501 is configured to obtain an initial image quality recognition model.

The training module is configured to input the histogram feature of each training sample image into the initial image quality recognition model, output a predicted value of each training sample image, input the predicted value of each training sample image and a value of the image quality label for each training sample image into a pre-constructed target loss function; and adjust parameters of the initial image quality recognition model according to a function value of the pre-constructed target loss function to obtain the image quality recognition model.

With the device provided by this embodiment, every time an image is captured, firstly the image quality of the video frame is identified based on the image quality recognition model and then the user is prompted to clean the camera in response to the result that the identified image quality of the video frame is fuzzy, such that the image can be captured based on the cleaned camera. With this method, the quality of captured image is improved.

For the device in above embodiment, the specific manner in which each module performs the operations has been described in detail in the embodiment of the method and is not elaborated again here.

Figure 6:
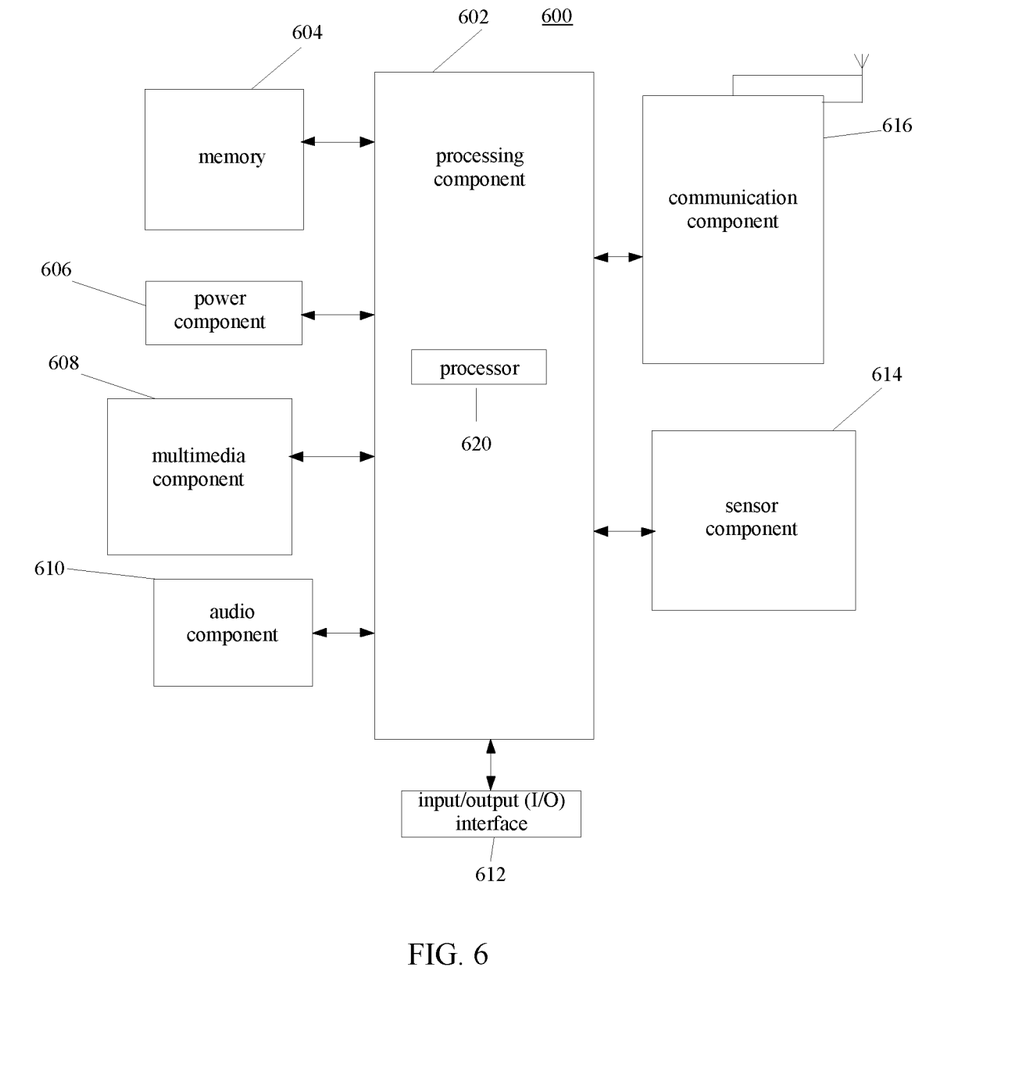
FIG. 6 is a block diagram of a device for capturing an image according to an example embodiment.

FIG. 6 is a block diagram illustrating a device 600 for capturing an image according to an example embodiment. For example, the device 600 may be a mobile phone, a computer, a digital broadcast terminal, a messaging device, a gaming console, a tablet, a medical device, an exercise equipment, a personal digital assistant, and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phone book data, messages, pictures, videos, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

The multimedia component 608 includes a screen providing an output interface between the device 600 and the user. In some embodiments, the screen may include a liquid crystal display (LCD) and a touch panel (TP). In some embodiments, an organic light-emitting diode (OLED) display or other types of displays can be adopted.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WIFI, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 604 including instructions, the above instructions are executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

The present disclosure further provides a computer readable non-volatile storage medium, when instructions stored in the storage medium is running on a processor of a mobile terminal, the mobile terminal is caused to perform an image capturing method.

Various embodiments of the present disclosure can have one or more of the following advantages. Every time an image is captured, the image quality of the video frame can be first identified based on the image quality recognition model and then prompts the user to clean the camera in response to the result that the identified image quality of the video frame is fuzzy, such that images are captured based on the cleaned camera. With this method, the quality of the captured image is improved.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, a flexible screen, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An image capturing method, comprising:
acquiring a video frame in a process of capturing an image through a camera;
extracting a target histogram feature based on the video frame;
inputting the target histogram feature into an image quality recognition model and outputting an image quality recognition result of the video frame, the image quality recognition model being configured to determine whether an image quality is fuzzy based on the target histogram feature; and
in response to the image quality recognition result indicating a fuzzy image quality, prompting a user to clean the camera;
wherein the extracting the target histogram feature based on the video frame comprises:
zooming the video frame to obtain a zoomed image;
obtaining a minimum pixel value from pixel values of each pixel point on three color channels;
generating a minimum-pixel-value image composed of the minimum pixel values of all the pixel points;
using a present window to slide on the minimum-pixel-value image and obtaining the minimum pixel value within the preset window for each sliding;
generating a filtered image composed of the obtained minimum pixel values within the preset window; and
extracting the target histogram feature from the filtered image.

2. The method according to claim 1, wherein the extracting the target histogram feature from the filtered image comprises:
summing up a number of pixel points for each pixel value contained in the filtered image;
drawing a target histogram corresponding to the filtered image based on each pixel value and the number of pixel points corresponding to the pixel value; and
extracting the target histogram feature from the target histogram.

3. The method according to claim 1, further comprising training the image quality recognition model comprising:
obtaining a plurality of training sample images, each training sample image being labeled with an image quality label;
extracting a histogram feature of each training sample image;
determining an initial image quality recognition model;
inputting the histogram feature of each training sample image into the initial image quality recognition model and outputting a predicted value of each training sample image;
inputting the predicted value of each training sample image and a value of the image quality label for the training sample image into a pre-constructed target loss function; and
adjusting parameters of the initial image quality recognition model based on a function value of the pre-constructed target loss function to obtain the image quality recognition model.

4. An image capturing device, comprising:
a processor;
a memory configured to store instructions executable by the processor;
wherein the processor is configured to:
acquire a video frame in a process of capturing an image through a camera;
extract a target histogram feature based on the video frame;
input the target histogram feature into an image quality recognition model and output an image quality recognition result of the video frame, the image quality recognition model being configured to determine whether an image quality is fuzzy based on the target histogram feature; and
in response to the image quality recognition result indicating a fuzzy image quality, prompt a user to clean the camera;
wherein the extracting the target histogram feature based on the video frame by:
zooming the video frame to obtain a zoomed image;
obtaining a minimum pixel value from pixel values of each pixel point on three color channels;
generating a minimum-pixel-value image composed of the minimum pixel values of all the pixel points;
using a present window to slide on the minimum-pixel-value image and obtaining the minimum pixel value within the preset window for each sliding;
generating a filtered image composed of the obtained minimum pixel values within the preset window; and
extracting the target histogram feature from the filtered image.

5. The device according to claim 4, wherein the extracting the target histogram feature from the filtered image comprises:
summing up a number of pixel points for each pixel value contained in the filtered image;
drawing a target histogram corresponding to the filtered image based on each pixel value and the number of pixel points corresponding to the pixel value; and
extracting the target histogram feature from the target histogram.

6. The device according to claim 4, wherein the processor is further configured to train the image quality recognition model by:
obtaining a plurality of training sample images, each training sample image being labeled with an image quality label;
extracting a histogram feature of each training sample image;
determining an initial image quality recognition model;
inputting the histogram feature of each training sample image into the initial image quality recognition model and outputting a predicted value of each training sample image;
inputting the predicted value of each training sample image and a value of the image quality label for the training sample image into a pre-constructed target loss function; and
adjusting parameters of the initial image quality recognition model based on a function value of the pre-constructed target loss function to obtain the image quality recognition model.

7. A non-transitory computer readable storage medium, having at least one instruction stored therein, wherein the at least one instruction is loaded and executed by a processor to realize the image capturing method comprising:
acquiring a video frame in a process of capturing an image through a camera;
extracting a target histogram feature based on the video frame;
inputting the target histogram feature into an image quality recognition model and outputting an image quality recognition result of the video frame, the image quality recognition model being configured to determine whether an image quality is fuzzy based on the target histogram feature; and in response to the image quality recognition result indicating a fuzzy image quality, prompting a user to clean the camera;

wherein the extracting the target histogram feature based on the video frame comprises:

zooming the video frame to obtain a zoomed image;

obtaining a minimum pixel value from pixel values of each pixel point on three color channels;

generating a minimum-pixel-value image composed of the minimum pixel values of all the pixel points;

using a present window to slide on the minimum-pixel-value image and obtaining the minimum pixel value within the preset window for each sliding;

generating a filtered image composed of the obtained minimum pixel values within the preset window; and extracting the target histogram feature from the filtered image.

8. The non-transitory computer readable storage medium according to claim 7, wherein the extracting the target histogram feature from the filtered image comprises:

summing up a number of pixel points for each pixel value contained in the filtered image;

drawing a target histogram corresponding to the filtered image based on each pixel value and the number of pixel points corresponding to the pixel value; and extracting the target histogram feature from the target histogram.

9. The non-transitory computer readable storage medium according to claim 8, wherein the method further comprises training the image quality recognition model comprising:

obtaining a plurality of training sample images, each training sample image being labeled with an image quality label;

extracting a histogram feature of each training sample image;

determining an initial image quality recognition model;

inputting the histogram feature of each training sample image into the initial image quality recognition model and outputting a predicted value of each training sample image;

inputting the predicted value of each training sample image and a value of the image quality label for the training sample image into a pre-constructed target loss function; and adjusting parameters of the initial image quality recognition model based on a function value of the pre-constructed target loss function to obtain the image quality recognition model.

10. A mobile phone implementing the method according to claim 1, comprising the camera, a display screen, and a speaker.

11. The mobile phone according to claim 10, wherein the mobile phone is configured to prompt the user to clean the camera by playing a specified audio file.

12. The mobile phone according to claim 10, wherein the mobile phone is configured to control a flashlight to flicker at a preset frequency to prompt the user to clean the camera.

13. The mobile phone according to claim 10, wherein the mobile phone is configured to control a vibrating motor to vibrate at a preset frequency to prompt the user to clean the camera.

14. The mobile phone according to claim 10, wherein the mobile phone is configured to display a prompting message on the display screen to prompt the user to clean the camera.

* * * * *